(12) United States Patent
Morovic et al.

(10) Patent No.: US 11,379,161 B2
(45) Date of Patent: Jul. 5, 2022

(54) DETERMINING CUMULATIVE PROBABILITY VALUES FOR SUBSETS OF ELEMENTS

(71) Applicant: Hewlett-Packard Development Company, L.P., Spring, TX (US)

(72) Inventors: Peter Morovic, Sant Cugat del Valles (ES); Jan Morovic, London (GB); Joan Vidal Fortia, Sant Cugat del Valles (ES); Jordi Arnabat Benedicto, Sant Cugat del Valles (ES); Javier Maestro Garcia, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 453 days.

(21) Appl. No.: 16/476,738

(22) PCT Filed: May 2, 2017

(86) PCT No.: PCT/US2017/030539
§ 371 (c)(1),
(2) Date: Jul. 9, 2019

(87) PCT Pub. No.: WO2018/203882
PCT Pub. Date: Nov. 8, 2018

(65) Prior Publication Data
US 2021/0141574 A1 May 13, 2021

(51) Int. Cl.
*G06F 3/12* (2006.01)
*G06F 17/18* (2006.01)

(52) U.S. Cl.
CPC .......... *G06F 3/1205* (2013.01); *G06F 3/1229* (2013.01); *G06F 17/18* (2013.01)

(58) Field of Classification Search
CPC combination set(s) only.
See application file for complete search history.

(56) References Cited

U.S. PATENT DOCUMENTS

| 8,605,322 B2 | 12/2013 | Barndt et al. |
| 8,922,838 B2 | 12/2014 | Fernandez del Rio et al. |
| (Continued) | | |

FOREIGN PATENT DOCUMENTS

WO    WO-2016018641 A1    2/2016

OTHER PUBLICATIONS

Matusik, W. et al., Printing Spatially-varying Reflectance, Dec. 16-19, 2009, < http://dl.acm.org/citation.cfm?id=1618474 >.

(Continued)

*Primary Examiner* — Helen Zong
(74) *Attorney, Agent, or Firm* — HP Inc. Patent Department

(57) ABSTRACT

In an example, a method includes acquiring data representing an article to be printed, the data comprising an element set associated with a print addressable location, the element set comprising a first element subset and a second element subset, wherein the first element subset and the second element subset comprise an element identifying a print material selection which is associated with a probability that the print material selection is to be applied to the associated print addressable location. The method further includes determining a first set of cumulative probability values associated with the elements of the first element subset and determining a second set of cumulative probability values associated with the elements of the second element subset. The first set of cumulative probability values may span a first predetermined value range and the second set of cumulative probability values may span a second predetermined value range.

18 Claims, 5 Drawing Sheets

(56) References Cited

U.S. PATENT DOCUMENTS

| | | |
|---|---|---|
| 8,985,735 B2 | 3/2015 | Fernandez del Rio et al. |
| 9,415,583 B2 | 8/2016 | Conesa et al. |
| 9,787,871 B2* | 10/2017 | Schweid ............... B29C 64/393 |
| 2007/0091369 A1 | 4/2007 | Liu et al. |
| 2014/0324204 A1 | 10/2014 | Vidimce et al. |
| 2017/0028650 A1* | 2/2017 | Utsunomiya .......... B33Y 30/00 |
| 2017/0282548 A1* | 10/2017 | Shikata ................ B41J 2/04551 |
| 2018/0131197 A1* | 5/2018 | McEwan ................ G06F 17/18 |

OTHER PUBLICATIONS

Peter Morovic et al. Parawacs: color halftoning with a single selector matrix. 2016 [online], [retrieved on Mar. 14, 2018]. Retrieved from< http://cv.ulichney.com/papers/2016-PARAWACS-CIC.pdf >.

* cited by examiner

DETERMINING CUMULATIVE PROBABILITY VALUES FOR SUBSETS OF ELEMENTS

BACKGROUND

Printing systems may convert input data (for example, data representing an image for two-dimensional printing, or data representing an object for three dimensional printing) to print instructions, which specify where print materials (for example, colorants such as inks or toners or other printable materials) are to be placed in a print operation.

Examples of techniques used in converting data may include use of threshold matrices, in which a particular print material or material combination (a print material selection herein) is assigned a probability of being applied in a particular location and the choice is made by comparing the probability values for the location to a threshold value. For example, a print material may be selected such that a drop of a particular color ink or other print material will be placed at a particular pixel to form an image.

BRIEF DESCRIPTION OF DRAWINGS

For a more complete understanding, reference is now made to non-limiting examples in the following description taken in conjunction with the accompanying drawings in which.

DETAILED DESCRIPTION

Figure 1:
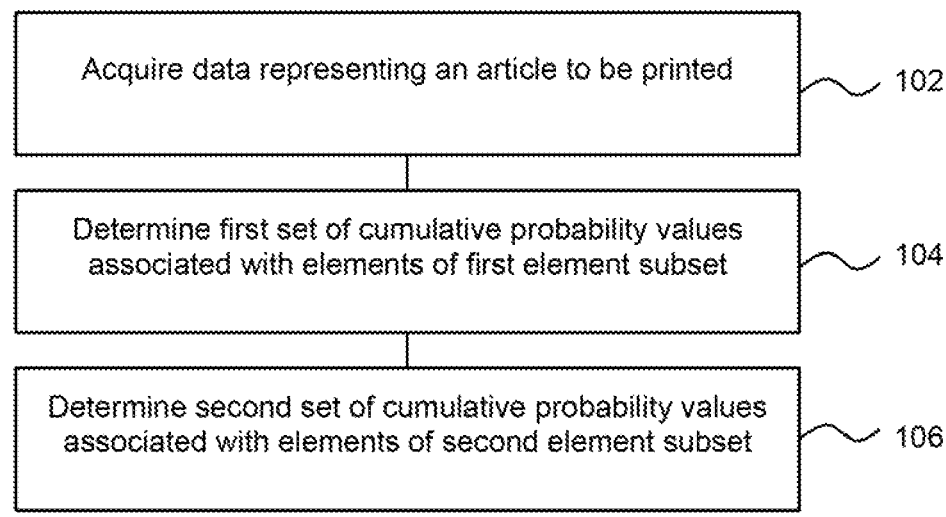
FIG. 1 is a flowchart of an example method of processing data relating to an article to be printed.

In the case of two-dimensional printing, a print addressable location may relate to at least one pixel, and each print addressable location may be printed with at least one colorant such as ink (for example cyan, magenta, yellow and black inks), coatings or other print materials, as well as combinations of those print materials.

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may comprise at least one voxel and each voxel may be 'printed' i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent onto a layer of the build material. Energy may be applied to the layer and the build material on which an agent has been applied may coalesce and solidify upon cooling. In other examples, directed energy may be used to selectively cause coalescence of build material, or chemical binding agents may be used to solidify a build material. In other examples, three-dimensional objects may be generated by using extruded plastics or sprayed materials as build materials, which solidify to form an object.

Some processes that generate three-dimensional objects use control data or print instructions generated from a model of a three-dimensional object. This control data may, for example, specify the locations at which to apply an agent to the build material, or where a build material itself may be placed, and the amounts to be placed. The control data may be generated from a 3D representation of an object to be printed.

Locations may be expressed in terms of voxels. A voxel at a given location may have at least one characteristic. For example, it may be empty, may have a particular color or may represent a particular material, or a particular object property, or the like. In general, the voxels of an object may each have the same shape (for example, cubic or tetrahedral), or may differ in shape and/or size. However, where the term voxel is used herein to refer to a print addressable location, the voxel size may be determined at the print resolution of a print apparatus, i.e. it may correspond to a volume which can be individually addressed by a print apparatus (which may be a particular print apparatus, of a class of print apparatus, or the like) such that the properties thereof can be determined at least substantially independently of the properties of other voxels.

It may be that possible print materials to be applied to an addressable location are specified within an element set. In some examples, the print materials may be identified explicitly. i.e. in a set of elements comprising a set of print materials and/or print material combinations, any of which may be selected for printing and are thus terms print material selections herein. In other examples, it may be that at least one of the elements of an element set relates to other qualities, which may in turn be related to print materials. For example, an element may specify a property or the like which can be mapped to print materials. In another example, a color may be specified in terms of a Neugebauer Primary (a set of the colors (and in some examples, the number of drops of printing agent) which can be applied by a particular print apparatus), which in turn may have predetermined mappings to colorants.

In some examples, a set of elements is expressed as a print material coverage representation which defines print material data, for example detailing (explicitly or implicitly, for example via a mapping) the amount of print materials (such as colorants or coatings for two dimensional printing or agents to be deposited onto a layer of build material, or in some examples, build materials themselves for three dimensional printing), and, if applicable, their combinations. Such print materials may be related to or selected to provide an image or object property such as, for example, color, transparency, flexibility, elasticity, rigidity, surface roughness, porosity, conductivity, inter-layer strength, density, and the like.

For example, a print addressable location represented within input data (for example, a pixel in image data or a voxel in object model data) may be associated with one or a set of print material coverage representations, for example, print material coverage vectors. In the case of two-dimensional printing, these may be referred to as area coverage vectors. For example, the vectors may comprise ink vectors, which specify proportions of inks to be applied (and may therefore be thought of as native to a printer) and/or Neugebauer Primary Area Coverage vectors (NPac vectors, or simply NPacs), which may specify colors in a manner which may be associated with inks or other colorants via a mapping (for example, using a look up table). By analogy, in three-dimensional printing, print agent vectors, which specify proportions of print agents to be applied and/or Material Volume coverage vectors (termed Mvoc vectors, or simply MVocs, herein) may be defined. Such coverage vectors may provide a probability that a print material may be applied in a location. In a simple case, such a vector may indicate that X % of a given region should have a particular print material applied thereto, whereas (100−X) % should be left clear of the print material. In practise, this may be resolved at the addressable resolution for the print material and/or printing device. Therefore, if there are N×M addressable locations in an XY plane associated with such a vector, X % of these locations may receive a print material, while (100−X) % do not.

Such a print material coverage representation may provide a plurality of values, wherein each value defines a probability for each, or each combination of print materials in an addressable location. For example, in a printing system with two available print materials (for example, inks, coatings or agents)—M1 and M2, where each print material may be independently deposited in an addressable area (e.g. voxel or pixel), there may be $2^2$ (i.e. four) probabilities in a given material coverage vector: a first probability for M1 without M2; a second probability for M2 without M1; a third probability for an over-deposit (i.e. a combination) of M1 and M2, e.g. M2 deposited over M1 or vice versa; and a fourth probability for an absence of both M1 and M2. In this example, it is assumed that a drop of print material may be applied or not: i.e. a binary choice may be made and the value for each agent may be either 0 or 1. In this case, a coverage vector (or an element set) may identify four possible print material selections: [M1, M2, M1M2, Z] or with example probabilities [M1:0.2, M2:0.2, M1M2:0.5, Z:0.1]—in a set of print addressable locations (e.g. and [x, y] or an [x, y, z] location (which in some examples may be a [x, y] location in a z slice)) to which the coverage vector applies, 20% of locations are to receive M1 without M2, 20% are to receive M2 without M1, 50% are to receive M1 and M2 and 10% are to be left clear. As each value is a proportion and the set of values represent the available material combinations, the set of values in each vector sum to 1 or 100%.

Such a print material coverage vector or element set may therefore specify a plurality of elements which are related to print materials, and a probability for each element which is represented as a value between 0 and 1.

FIG. 1 is an example of a method, which may be a computer implemented method for characterising an article to be printed.

Block 102 comprises acquiring data, for example at a processor, representing an article to be printed. The article may for example comprise a substantially two dimensional image, for example a picture, pattern or text to be applied to a substrate such as paper, card or plastic. In other examples, the article may comprise an object to be printed using additive manufacturing techniques.

The data comprises an element set associated with a print addressable location (and in some examples comprises a plurality of element sets associated with a plurality of locations), the element set comprising a first element subset and a second element subset, wherein the first element subset and the second element subset each comprises an element (and in some examples, each element subset may comprise a plurality of elements) identifying a print material selection which is associated with a probability that the print material selection is to be applied to the associated print addressable location. The print material selections may be identified directly or via a mapping. In some examples, the data may comprise a plurality of such elements sets.

Each element subset may for example comprise a print agent coverage vector, which may for example comprise an ink vector, an NPac, print agent vector or an MVoc as described above. The associated print addressable location may comprise one or a plurality of pixels or voxels. In some examples, a plurality of print addressable locations are associated with an element subset. An element set may be formed for a particular print location or plurality of print addressable locations which are associated with a particular combination of subsets.

For example, a first subset may specify a set of colors (or the print agents to be applied to achieve a color) and a second subset may specify a coating to be applied over a color. However, the subsets could correspond to different combinations of print agents, for example, for example relating to any print agents which it may be intended to distribute independently from one another. It may be noted that both the first subset and the second subset relate to the same print addressable location.

To consider a first simple example subset where each of four print agents (cyan C, magenta M, Yellow Y and black K) may be applied with the same area coverage, such that a color is applied at each print addressable location with binary control (i.e. a print agent is printed or not, with no variation as to amount) and no overprinting of colors.

This could be expressed as:

$$[C:0.25, M:0.25, Y:0.25, K:0.25]$$

A second subset may relate to a coating treatment T. In this example, this is to be applied with a 50% area coverage and therefore the subset may be expressed as:

$$[Z: 0.5, T:0.5] \text{ (where Z indicates 0, or that no print agent is applied).}$$

In other examples, there may be more than two subsets.

Block 104 comprises determining a first set of cumulative probability values associated with the elements of the first element subset and block 106 comprises determining a second set of cumulative probability values associated with the elements of the second element subset. Determining the cumulative probability values may comprise determining a cumulative probability for an element comprises summing a probability for that element and all preceding elements in the element subset until a cumulative probability associated with that element and all preceding elements in the subset. For example, the cumulative probability CP for element i for a subset of elements each having an associate probability P may be expressed as:

$$CP_i = \Sigma_1^i P_j$$

To continue the first example, the first set could be expressed as {C:0.25, M: 0.50, Y: 0.75, K: 1} and the second set could be expressed as {Z:0.5, T:1}. Note, the sum is carried out a 'per subset' basis.

However, the cumulative probability values may not be the cumulative probabilities themselves (albeit that the cumulative probability values may be based on such cumulative probabilities). In particular, the first set of cumulative probability values is determined so as to span a first predetermined value range and the second set of cumulative probability values is determined so as to span a second predetermined value range. The first and second predetermined value ranges are selected to reflect an intended granular control of the print agents of a subset It may be noted that in this example, the 'range' spanned by the two element subsets each spans 100%. In such an example, the granular control for each subset may be the same. However, in other examples, the first and second predetermined value ranges may be different. In some examples, this may be achieved by provided subsets of elements associated with probabilities which sum to a value other than 100% (and which may sum to different values). In other examples, as is now described, the method may use a scaling factor.

Figure 2:
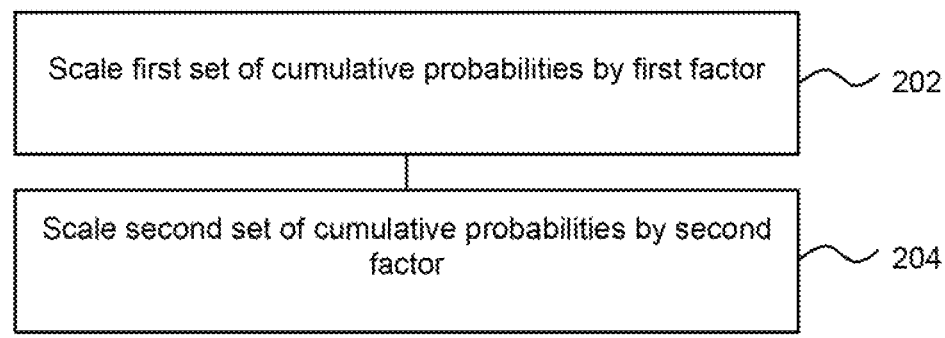
FIG. 2 is an example method of determining sets of cumulative probability values associated with the elements of the different element subsets.

FIG. 2 is an example method of determining cumulative probability values comprising the use of scaling factors.

Block 202 scaling cumulative probabilities determined for the first subset by a first factor f1 to determine the first set of cumulative probability values spanning the first predetermined value range; and block 204 comprises scaling the second set of cumulative probabilities determined for the second subset by a second factor f2 to determine the second set of cumulative probability values spanning the second predetermined value range.

The first and second factor may be different from one another and may be selected to reflect and intended granular control of the print agents of a set. For example, it may be that colors are to be distributed with a greater granular control than the coating treatment. In such an example, the first factor, which relates to the color subset, may be larger than the second factor, which relates the coating treatment subset.

The scaled subsets may provide cumulative probability element sets for the article to be printed. For example, the cumulative probability element set for the example above would be:

$$<C{:}0.25*f1, M{:}\ 0.50*f1, Y{:}\ 0.75*f1, K{:}\ f1, Z{:}\ 0.5f2, T{:}\ f2>$$

In some examples, a new representation of the object may be determined comprising a plurality of such cumulative probability element sets, such that each print addressable location is associated with a cumulative probability element set. Thus, in this example, the first value range is 0-f1 and the second value range is 0-f2.

In some examples, the probabilities may be scaled rather than the cumulative probabilities.

Figure 3:
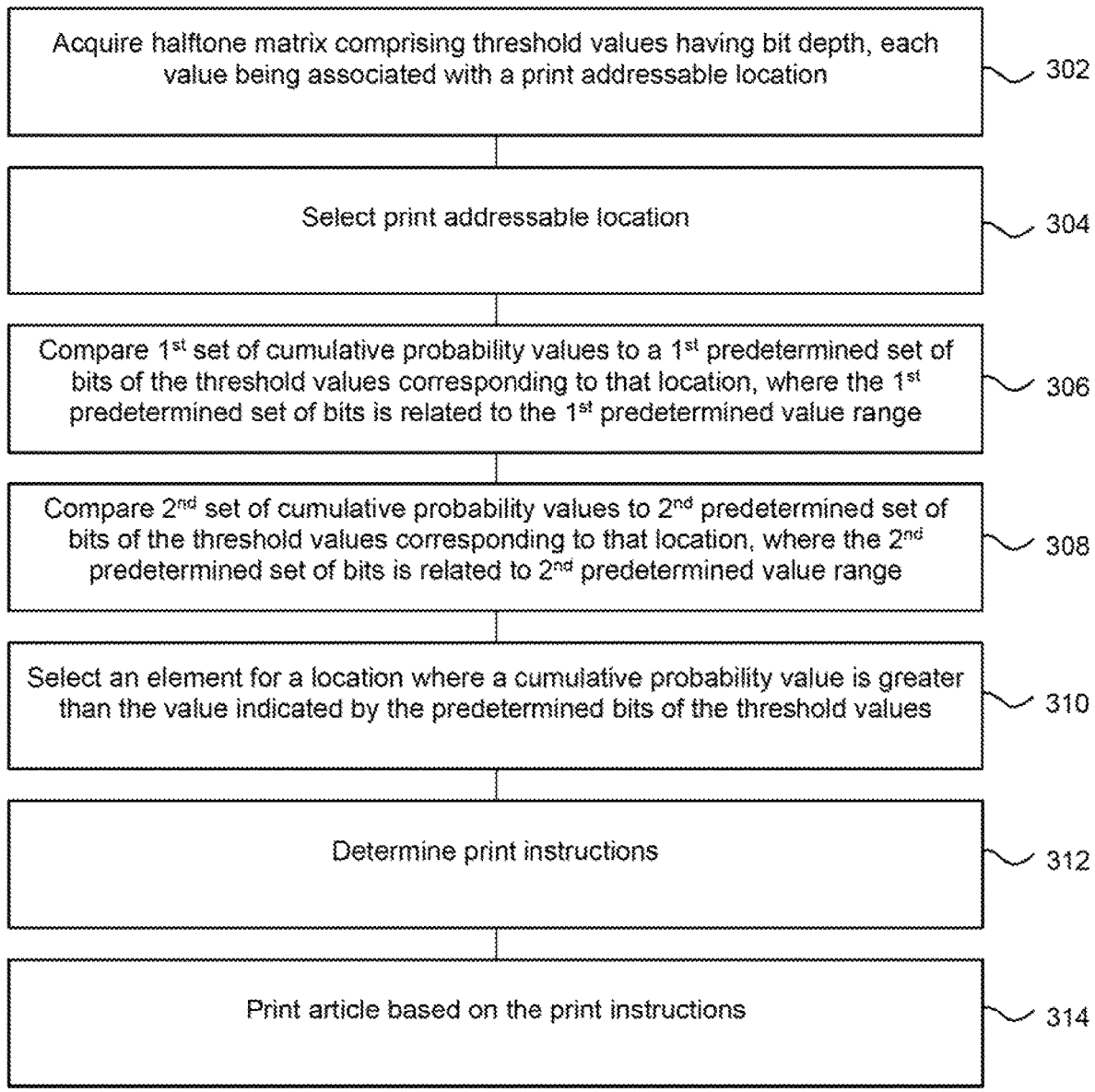
FIG. 3 s a flowchart of an example method for printing an article.

FIG. 3 is an example of a method of determining print instructions from such cumulative probability value element sets.

Block 302 comprises acquiring a halftone matrix. The halftone matrix comprises threshold values having bit depth, each value being associated with a print addressable location. In a simple example, the halftone matrix may a 4 bit matrix, so there are 16 possible values, and print addressable location may have a value of 0 to 15 associated therewith. More generally, the halftone matrix comprises threshold values having bit depth of n, where n is any integer.

Block 304 comprises selecting a particular print addressable location. Block 306 comprises comparing the first set of cumulative probability values to a first predetermined set of bits of the threshold values corresponding to that location, where the number of bits in the first predetermined set of bits is related to the first predetermined value range. For example, a particular i bits of the value may be associated with the first subset. Where a scaling factor is used to attain the first predetermined value range as described in FIG. 2, the number of bits in the set may be related to the factor f1 (and to the level of granularity) such that $f1=2^i$. To consider a particular example for a 4 bit threshold matrix, if i=3, then f1 (or the value range for the first set of cumulative probability values) may be 8.

Block 308 comprises comparing the second set of cumulative probability values to a second predetermined set of bits of the threshold values corresponding to that location where the second predetermined set of bits is related to the second predetermined value range. For example, a particular j bits of the value may be associated with the second subset. Where a scaling factor is used to attain a set of values spanning the second predetermined value range as described in relation to FIG. 2, the number of bits in the set may be related to the factor f2 (and to the level of granularity) such that $f2=2^j$. To consider a particular example for a 4 bit threshold matrix, if j=1, then f2 (or the value range for the second set of cumulative probability values) may be 2.

Block 310 comprises, when a cumulative probability value is greater than the value indicated by the predetermined bits of the threshold values, selecting an element for that location. For example, block 310 may carried out in response to a determination that a cumulative probability value exceeds a threshold value. In this example, this may comprise selecting one element from each subset, or two elements from each cumulative probability element set. The method may then proceed by selecting a new location and may loop until elements are selected from each subset for each location. The elements may be compared in order of ascending value within their respective subsets until the first element having a cumulative probability value which is greater than the value indicated by the predetermined bits of the threshold values is found.

Block 312 comprises determining print instructions. This comprises determining an instruction that the print material selection corresponding to the selected elements for each of a plurality of locations is printed at a corresponding location.

Block 314 comprises printing an article based on the print instructions. This may be a two dimensional or three dimensional article.

Returning to the example above, if the cumulative probability element set is <C:0.25f1, M: 0.50*f1, Y: 0.75*f1, K: f1, Z: 0.5f2, T: f2>, and f1 is 8, and f2 is 2, then this may be written as:

$$<C{:}\ 2, M{:}\ 4, Y{:}\ 6, K{:}8, Z{:}\ 1, T{:}\ 2>$$

Now consider that this cumulative probability value element set corresponds to a location in the threshold matrix having a value of 8. Considered in binary form, this is [1 0 0 0]. If the first set of bits is the first three bits, or [1 0 0], this has a value of 4.

The values may be compared in order and the first value exceed the threshold may be selected. Thus, block 310 for the first subset comprises finding the first value which is greater than 4, which is Y. Thus Yellow is selected from the first subset, and an instruction to print a yellow dot at that location may result in block 312, with a yellow dot being printed in block 314. For the last bit, this has a value of 0 and the first element within the second subset which has a value greater than 0 is Z, so no coating treatment will be applied at that location.

In summary therefore, determining which element to select may be carried out by considering the elements in order, and comparing, on a location-by-location and subset by subset basis, each location of the data in each subset to a threshold value in a corresponding location in the matrix. Each element may be considered in order until the cumulative probability associated with that element and all previously considered elements is at least the threshold value (when considered as a proportion of the full range of threshold values) for that location. It may be noted that the subsets may be distinguished from one another on the basis that are compared to separate thresholds in a halftoning process.

Note that, when scaling factors are used as described in relation to FIG. 2, $2^n=f1*f2$. More generally, $2^n$ may be the product of the factors or value ranges associated with the subsets.

Such a method allows print materials associated with the first set to be distributed in a manner which is decoupled from other subsets. Another way to achieve this would be define an element set which considers all combinations. For the example above, this would mean considering an element set in which each color could be printed alone, or in combination with a coating treatment. For even this simple example, this would result in an 8-element set, where the present example had 6 elements. Where more combinations are considered (for example, the colors may be over printed, the amount of each print agent may be controlled, etc.) then the size of the element set would soon become large, increasing both memory storage specification and processing resources specifications. The methods described herein provide independent control of the elements in each set. Moreover, the use of the value ranges allow a level of granularity to be assigned to each of the subsets.

Figure 4:
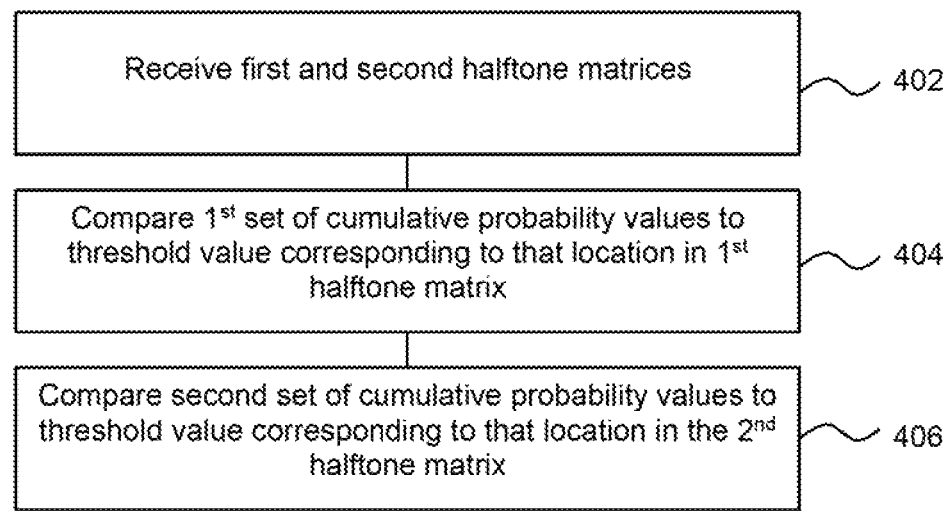
FIG. 4 is a flowchart of another example method of processing data relating to an article to be printed.

FIG. 4 shows an alternative example for a method, which may for example replace blocks 302 to 308 in the method of FIG. 3.

Block 402 comprises receiving a first halftone matrix and a second halftone matrix. The first halftone matrix may have a bit depth of i, where the first value range is $2^i$ and the second halftone matrix may have a bit depth of j, where the second value range is $2^j$. Block 404 comprises comparing the first set of cumulative probability values to the threshold value corresponding to that location in the first halftone matrix and block 406 comprises comparing the second set of cumulative probability values to the threshold value corresponding to that location in the second halftone matrix. In each of blocks 404 and 406, cumulative probability values may be compared to threshold values in order and the first value exceeding the threshold may be selected, i and j may be different from one another.

In a further example, the method may comprise applying an explicit mapping between the elements of one element subset and print agents of print agent combinations. For example, if the first i bits of a halftone matrix are used for one subset of elements and the second j bits for a second subset, it is the first K levels within a threshold matrix are used by the first subset of bits, the next L levels for the next subset, etc., where $K+L+ \ldots =2^n$. This allows flexibility in dividing up the available levels than relying on factors related to powers of 2.

It may be noted that, in the example above, one element subset comprises a non-print "Z" print material selection element indicative that no print agent is to be applied to the print addressable location, and the Z element was arranged between the two subsets. In some examples, the method may comprise arranging the element subset such that a non-print element is at the boundary between two subsets. This allows for dynamically varying the number of levels within a threshold matrix which are used for each subset, i.e., depending on the area coverages of print agent selections before a Z element and those after it, more of less of the available levels will be allocated to the two element subsets.

Figure 5:
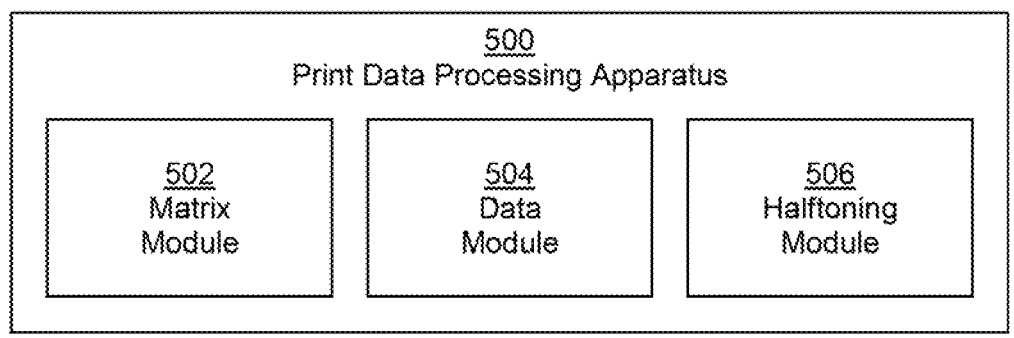
FIGS. 5 and 6 are block diagrams of example print data processing apparatus.

FIG. 5 is an example of a print data processing apparatus 500. The print data processing apparatus 500 determines, in use of the print data processing apparatus 500, print instructions to independently distribute a first subset of print material selection(s) and a second subset of print material selection(s).

The print data processing apparatus 500 comprises a matrix module 502, a data module 504, and a halftoning module 506. Each module 502, 504, 506 comprises, in this example, a combination of circuitry and a set of executable instructions to perform the actions set out below.

The matrix module 502 acquires a halftone matrix, for example by generating a matrix or by acquiring the matrix from another source, for example a memory, or over a network, or the like.

The data module 504 acquires data representing an article to be printed comprising an element set associated with each of a plurality of print addressable locations, the element set comprising a first subset of elements and a second subset of elements, wherein each element identifies a print material selection (which may comprise a non-print element) and is associated with a probability that the print material selection identified by the element is to be applied to a print addressable location.

The halftoning module 506 applies at least one halftone matrix on a location-by-location basis to the data representing the article to be printed to identify an element of the first subset and an element of the second subset which is associated with a cumulative probability value corresponding to a threshold value for that location, wherein the cumulative probability value is determined by summing a probability for that element and all preceding elements in the element subset (and in some examples scaled as described above). The cumulative probability values for the first subset of elements spans a first predetermined value range and the cumulative probability values for the second subset of elements spans a second predetermined value range. The threshold value may be whole value stored in that location, or the value of a subset of the bits. For example, the halftoning module may select the first element of a subset for which the cumulative probability value exceeds at least part (e.g. the value of a subset of the bits of) a value in the halftone matrix. The halftoning module 506 may be configured to select, from a set of elements (for example, an ink vector, print agent vector, an NPac or an Mvoc as described above, which may be from input data received by the data module 504) an element for a first print addressable location (for example a pixel or a voxel). Some elements may be associated with a print material selection, either explicitly or implicitly, for example via a mapping or look up table.

Figure 6:
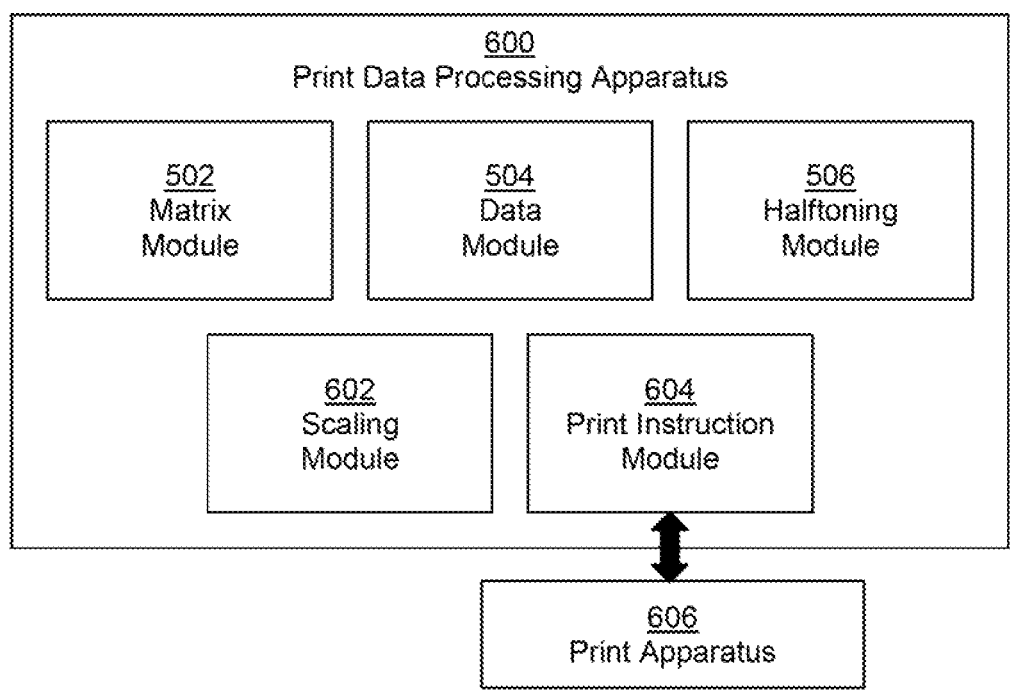

FIG. 6 is another example of a print data processing apparatus 600. In addition to the matrix module 502, data module 504 and halftoning module 506, the print data processing apparatus 600 further comprises a scaling module 602, a print instruction module 604 and is associated with a print apparatus 606 (and in some examples may comprise a component thereof). Each module 602, 604 comprises, in this example, is a combination of circuitry and a set of executable instructions to perform the actions set out below.

The scaling module 602, in use of the apparatus 600, scales probabilities associated with a subset (which may be cumulative probabilities or individual probabilities assigned to the elements), wherein the scaling module is to apply a first scaling factor to the first subset to attain the first predetermined value range for the cumulative probability values of the first subset and a second scaling factor to the second subset to attain the second predetermined value range for the cumulative probability values of the first subset. This allows different granularities of control to be associated with each of the subsets.

The print instruction module 604, in use of the apparatus 600, determines print instructions based on elements identified by the halftoning module. This may comprise determining print control data comprising instructions for the print apparatus 606 to print using the materials or material combinations specified by selected elements in each print addressable location.

The print apparatus 606 is to print an article according to print instructions. This may be two dimensional or three dimensional article. To that end, the print apparatus 606 may comprise additional print apparatus components such as one or more print heads, one or more print agent supplies, and the like. Where the print apparatus is a 'two dimensional' printer, it may comprise a laser printer or an inkjet printer or the like, and may comprise a print head, substrate handling systems, sources of inks or toner, and the like. Where the printer is a 'three dimensional' printer, it may comprise, or be associated with, a print bed, a fabrication chamber, a print head, one or more energy sources, a source of build material, or the like.

Figure 7:
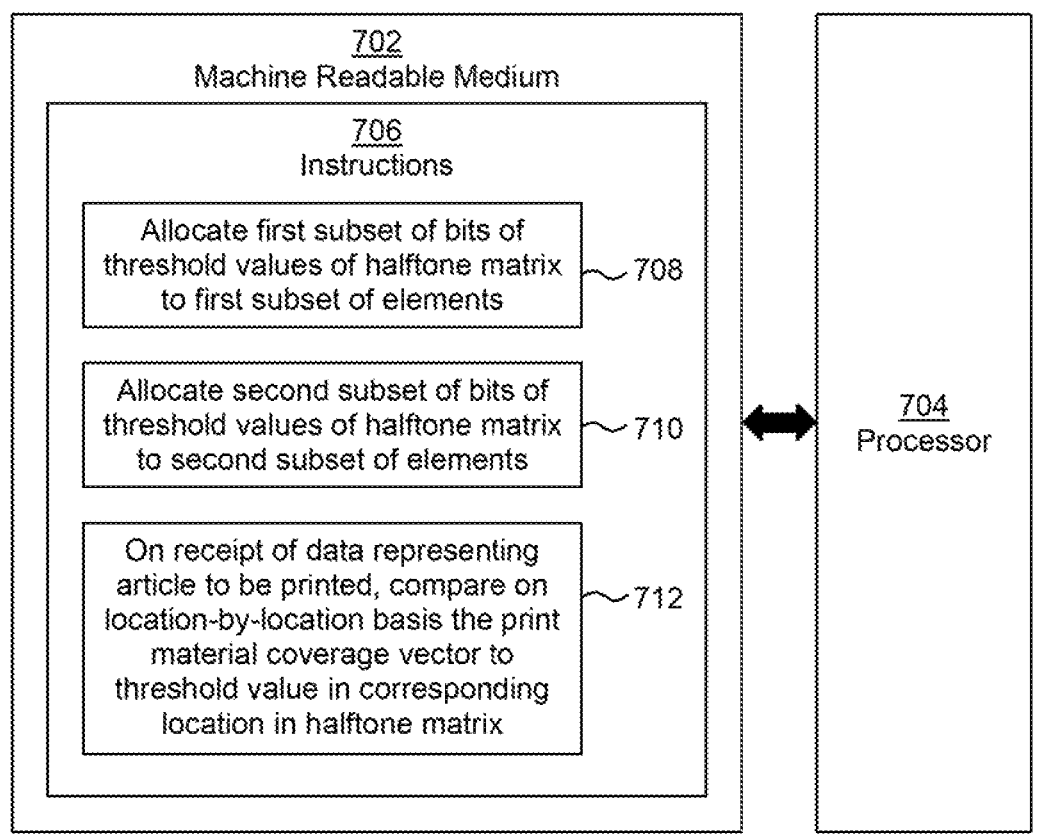
FIG. 7 is a simplified schematic of an example non-transitory machine readable medium associated with a processor.

FIG. 7 shows an example of a non-transitory machine-readable medium 702 in association with a processor 704. The machine-readable medium 702 has instructions 706 stored thereon. The instructions 706 when executed by a processor 704, cause the processor 704 to perform processing operations and comprise: (i) instructions 708 to cause the processor 704 to allocate a first subset of bits of threshold values of a halftone matrix to a first subset of elements, (ii) instructions 710 to cause the processor 704 to allocate a second subset of bits of threshold values of the halftone matrix to a second subset of elements, (iii) instructions 712 to cause the processor 704 to, on receipt of data representing an article to be printed, the data comprising a print material coverage vector comprising a first and second subset of elements corresponding to a print addressable location of the article, (a) compare, on a location-by-location basis, the elements of the print material coverage vector to a threshold value in a corresponding location in the halftone matrix wherein (i) the elements of each print material coverage vector are arranged in an order; and (ii) comparing on a location-by-location basis, each location to a threshold value in a corresponding position comprises selecting each element of a subset of elements in the order until a cumulative probability value associated with a probability for that element and all previously selected elements in that subset is at least the value of the subset of bits of the threshold value for that location allocated to the subset.

The print data processing apparatus 500, matrix module 502, data module 504, halftoning module 506, scaling module 602 and print instruction module 604 may be implemented with one or a plurality of processors executing machine readable instructions stored in a memory, or a processor operating in accordance with instructions embedded in logic circuitry. The term module herein may refer to a hardware component of the apparatus.

Examples in the present disclosure can be provided as methods, systems or machine readable instructions, such as any combination of circuitry of a combination of circuitry and executable instructions. Such machine readable instructions may be included on a non-transitory machine (for example, computer) readable storage medium (including but is not limited to disc storage. CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, or a module thereof, may execute the machine readable instructions. Thus functional modules of the apparatus 500, 600 (for example, the matrix module 502, data module 504, halftoning module 506, scaling module 602 and print instruction module 604) and devices may be implemented by a processor executing machine readable instructions stored in a memory, or a processor operating in accordance with instructions embedded in logic circuitry. The term 'processor' is to be interpreted broadly to include a CPU, processing unit. ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by blocks in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   acquiring a first halftone matrix comprising a first threshold value associated with a print addressable location;
   acquiring a second halftone matrix comprising a second threshold value associated with the print addressable location;
   acquiring data representing an article to be printed and comprising a first element subset and a second element subset that each comprise a plurality of elements, each element identifying a print material selection and a probability that the print material selection is to be applied to the print addressable location;
   determining a first set of cumulative probability values associated with the elements of the first element subset and spanning a first value range;
   determining a second set of cumulative probability values associated with the elements of the second element subset and spanning a second value range;
   comparing the first set to the first threshold value;
   comparing the second set to the second threshold value;
   selecting for the print addressable location each element in the first halftone matrix for which the associated cumulative probability value of the first set is greater than the first threshold value; and
   selecting for the print addressable location each element in the second halftone matrix for which the associated cumulative probability value of the second set is greater than the second threshold value.

2. The method according to claim 1, wherein the first threshold value has a first bit depth, and the second threshold value has a second bit depth,
   wherein comparing the first set to the first threshold value comprises comparing the first set to a first set of bits of the first threshold value the first set having a number of bits related to the first value range,
   wherein comparing the set to the second threshold comprises comparing the second set to a second set of bits of the second threshold value, the second set having a number of bits related to the second value range.

3. The method according to claim 2, wherein the first bit depth is n, the first value range is f1, the second value range is f2, and $2^n = f1*f2$.

4. The method according to claim 2, wherein the first bit depth is n, and $2^n$ is a product of the first and second value ranges.

5. The method according to claim 2, further comprising:
   determining print instructions to print the print material selection corresponding to each selected element at the print addressable location.

6. The method according to claim 5, further comprising:
   printing the article based on the print instructions.

7. The method according to claim 1, wherein determining the first set of cumulative probability values associated with the elements of the first element subset comprises, for each element of the first element subset, summing the probability of the element and the probabilities of all preceding elements in the first element subset to obtain a cumulative probability associated with the element,
   and wherein determining the second set of cumulative probability values associated with the elements of the second element subset comprises, for each element of the second element subset, summing the probability of the element and probabilities of all preceding elements in the second element subset to obtain a cumulative probability associated with the element.

8. The method according to claim 7, further comprising:
   scaling the cumulative probabilities associated with the elements of the first subset by a first factor to determine the first set of cumulative probability values spanning the first predetermined value range; and
   scaling the cumulative probabilities associated with the elements of the second subset by a second factor to determine the second set of cumulative probability values spanning the second predetermined value range.

9. The method according to claim 1, wherein a non-print element indicative that no print agent is to be applied to the print addressable location is at a boundary between the first element subset and the second element subset.

10. A method according to claim 1, further comprising:
    applying an explicit mapping between the elements of one of the first and second element subsets and print agents.

11. A print data processing apparatus comprising:
    a processor;
    a memory storing instructions executable by the processor to:
      acquire a first halftone matrix comprising first threshold values respectively associated with print addressable locations;
      acquire a second halftone matrix comprising second threshold values respectively associated with the print addressable locations;
      acquire data representing an article to be printed and comprising an element set associated with each print addressable location, the element set associated with each print addressable location comprising a first subset of elements and a second subset of elements, each element identifying a print material selection and a probability that the print material selection identified is to be applied to the print addressable location;
      determine a first set of cumulative probability values spanning a first value range and associated with the elements of the first subset associated with each print addressable location by, for each element, summing the probability of the element and the probabilities of all preceding elements in the first subset to obtain a cumulative probability associated with the element;
      determine a second set of cumulative probability values spanning a second value range and associated with the elements of the second subset associated with each print addressable location by, for each element, summing the probability of the element and the probabilities of all preceding elements in the second subset to obtain a cumulative probability associated with the element; and
      apply the halftone matrix to the data representing the article to be printed to identify for each print addressable location:
        each element of the first subset associated with the print addressable location for which the associated cumulative probability value of the first set is greater than the first threshold value associated with the print addressable location; and
        each element of the second subset associated with the print addressable for which the associated cumulative probability value is greater than the second threshold value associated with the print addressable location.

12. The print data processing apparatus according to claim 11, wherein the instructions are executable by the processor to further:

scale the cumulative probabilities associated with the elements of the first subset associated with each print addressable location by a first scaling factor to determine the first set of cumulative probability values spanning the first value range; and scale the cumulative probabilities associated with the elements of the second subset associated with each print addressable location by second scaling factor to determine the second set of cumulative probability values spanning the second value range.

13. The print data processing apparatus according to claim 11, wherein the instructions are executable by the processor to further:

determine print instructions for a print apparatus to print the article according to the instructions based on each element that has been identified for each print addressable location.

14. A non-transitory machine-readable medium with instructions stored thereon and that are executable by a processor to:

acquire a first halftone matrix comprising a first threshold value associated with a print addressable location and having a first bit depth;

acquire a second halftone matrix comprising a second threshold value associated with the print addressable location and having a second bit depth;

acquire data representing an article to be printed and comprising a first element subset and a second element subset that each comprise a plurality of elements, each element identifying a print material selection and a probability that the print material selection is to be applied to the print addressable location;

determine a first set of cumulative probability values associated with the elements of the first element subset and spanning a first value range;

determine a second set of cumulative probability values associated with the elements of the second element subset and spanning a second value range;

compare the first set to a first set of bits of the first threshold value, the first set of bits having a number of bits related to the first value range;

compare the second set to a second set of bits of the second threshold value, the second set of bits having a number of bits related to the second value range;

select for the print addressable location each element in the first halftone matrix for which the associated cumulative probability value of the first set is greater than the first set of bits; and selecting for the print addressable location each element in the second halftone matrix for which the associated cumulative probability value of the second set is greater than the second set of bits.

15. The non-transitory machine-readable medium according to claim 14, wherein the first bit depth is n, the first value range is f1, the second value range is f2, and $2^n = f1 * f2$.

16. The non-transitory machine-readable medium according to claim 14, wherein the first bit depth is n, and $2^n$ is a product of the first and second value ranges.

17. The non-transitory machine-readable medium according to claim 14, wherein the instructions are executable by the processor to further:

determine print instructions to print the print material selection corresponding to each selected element at the print addressable location.

18. The non-transitory machine-readable medium according to claim 14, wherein the instructions are executable by the processor to further:

print the article based on the print instructions.

* * * * *